United States Patent
Clifford et al.

(10) Patent No.: US 9,328,908 B2
(45) Date of Patent: May 3, 2016

(54) LED STROBE LIGHT WITH INTEGRATED MAGNET AND HEAT SINK CHIMNEY

(71) Applicant: Checkers Industrial Products, LLC, Broomfield, CO (US)

(72) Inventors: Scott Clifford, Mesa, AZ (US); Steven N. D. Brundula, Chandler, AZ (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 174 days.

(21) Appl. No.: 13/864,121

(22) Filed: Apr. 16, 2013

(65) Prior Publication Data

US 2014/0307443 A1  Oct. 16, 2014

(51) Int. Cl.

| | |
|---|---|
| F21V 29/00 | (2015.01) |
| F21S 4/00 | (2006.01) |
| F21V 21/00 | (2006.01) |
| F21V 29/02 | (2006.01) |
| F21V 29/74 | (2015.01) |
| F21V 21/096 | (2006.01) |
| F21V 29/83 | (2015.01) |
| B60Q 1/26 | (2006.01) |
| F21V 17/00 | (2006.01) |
| F21Y 101/02 | (2006.01) |
| F21Y 111/00 | (2016.01) |

(52) U.S. Cl.
CPC .............. *F21V 29/02* (2013.01); *B60Q 1/2611* (2013.01); *B60Q 1/2615* (2013.01); *F21V 21/096* (2013.01); *F21V 29/74* (2015.01); *F21V 29/83* (2015.01); *F21V 17/002* (2013.01); *F21Y 2101/02* (2013.01); *F21Y 2111/007* (2013.01); *Y10T 29/49895* (2015.01)

(58) Field of Classification Search
CPC ....... F21V 29/02; F21V 29/83; F21V 21/096; F21V 29/74; F21V 17/002; B60Q 1/2615; B60Q 1/2611; F21Y 2101/02; F21Y 2111/007; Y10T 29/49895
USPC .......................................................... 362/294
See application file for complete search history.

(56) References Cited

U.S. PATENT DOCUMENTS

| | | | |
|---|---|---|---|
| 7,654,699 B2 * | 2/2010 | Chang et al. ................... | 362/294 |
| 7,744,251 B2 * | 6/2010 | Liu et al. ........................ | 362/294 |
| 7,934,851 B1 * | 5/2011 | Boissevain et al. ........... | 362/241 |
| 8,123,382 B2 * | 2/2012 | Patrick et al. ................... | 362/294 |
| 2002/0122309 A1 * | 9/2002 | Abdelhafez et al. .......... | 362/294 |
| 2005/0259434 A1 * | 11/2005 | Pederson ....................... | 362/555 |
| 2008/0316755 A1 * | 12/2008 | Zheng et al. ................... | 362/373 |
| 2009/0059559 A1 * | 3/2009 | Pabst et al. ....................... | 362/84 |
| 2010/0265710 A1 * | 10/2010 | Xiao et al. ................ | 362/249.02 |
| 2010/0314985 A1 * | 12/2010 | Premysler ........................ | 313/46 |
| 2011/0249430 A1 * | 10/2011 | Stamatatos et al. ........... | 362/184 |

FOREIGN PATENT DOCUMENTS

JP    2004296245 A   * 10/2004

\* cited by examiner

Primary Examiner — Donald Raleigh
(74) Attorney, Agent, or Firm — Holland & Hart

(57) ABSTRACT

A strobe light includes a base, a mounting post, a plurality of light emitting diodes (LED) lights, a lens, and a channel. The mounting post extends vertically from the base. The plurality of LED lights are mounted around a periphery of the mounting post. The lens is connected to the base and covers the mounting post and the plurality of LED lights. The channel extends through the base, mounting post and lens. Air flowing through the channel transfers heat generated by the plurality of LED lights out of the strobe light.

27 Claims, 8 Drawing Sheets

LED STROBE LIGHT WITH INTEGRATED MAGNET AND HEAT SINK CHIMNEY

BACKGROUND

Strobe lights are well-known products. A number of technologies are possible for use in strobe lights. Gas discharge strobe lights find particular application for emergency vehicles, radio towers, photography, and entertainment venues. Such conventional strobe lights utilize incandescent or gas light sources. Incandescent and gas source strobe lights have relatively high energy consumption and short lifetimes, which result in higher maintenance costs. Gas discharge strobe lights may be more susceptible to breaking, may produce ozone due to high voltage requirements, and may produce ultraviolet light that breaks down many materials. Further, such strobe lights have complicated electronics used to maintain the flashing operation.

Another type of strobe light uses high intensity discharge (HID) lamps. Light is produced by high intensity discharge lamps when an electric current arced between two closely spaced electrodes in a sealed quartz-glass or ceramic capsule, known as a discharge tube, arc tube, or burner, containing a vapor of metal and gas. Free electrons in the arc collide with the metal atoms in the vapor exciting electrons of the metal atoms to a higher energy state. When the excited electrons return to their original, lower energy level, electromagnetic radiation is emitted having a wavelength determined by the energy level of the electrons and the constituency of the vapor into the capsule. Compared to filament-type halogen lamps, HID lighting typically produces light more efficiently and with a color temperature more closely approximating that of sunlight. Unlike an incandescent lamp, an HID lamp does not immediately illuminate when power is supplied to the lamp. While initiating operation of an HID lamp takes considerable time, the time required to re-strike (restart) an extinguished lamp is typically longer, and commonly twice as long as the cold startup interval. For these and other reasons, strobe lights that use HID lamps are less desirable in many applications.

It is common for strobe lights to generate large amounts of heat due to the high levels of energy required generate the bright, flashing light outputs. Heat can have detrimental effects on many types of light generating devices. Since most strobe lights include a cover or lens within which the light generating devices are housed, the heat is trapped in proximity to the light generating members, which further increases the operating temperatures of the strobe light.

Opportunities exist for improving strobe light technologies that address these and other issues.

SUMMARY

As will be described in greater detail below, one aspect of the present disclosure relates to a strobe light having a base, a mounting post, a plurality of light emitting diode (LED) lights, a lens, and a channel. The mounting post extends vertically from the base. The plurality of LED lights are mounted around a periphery of the mounting post. The lens is connected to the base and covers the mounting post and the plurality of LED lights. The channel extends through the base, mounting post and lens. Air flowing through the channel transfers heat generated by the plurality of LED lights out of the strobe light.

The channel may include a liquid-tight interface with the base, mounting post and lens. The strobe light may include a connector configured to connect the mounting post to the lens, and the channel may extend through the connector. The connector may extend through the lens and be threadably connected to the mounting post. The lens may include a bottom end and a top end, wherein the bottom end is releasably connected to the base, and the channel extends through the top end. The strobe light may include a plurality of fins extending radially into the channel. The plurality of fins may extend along a length of the mounting post. The base may include a plurality of side openings to permit airflow into the channel along a bottom side of the base. The strobe light may be oriented with the mounting post extending vertically upward from the base, and the channel may be open along a top surface of the lens. The base may include a plurality of magnets embedded in the base.

Another aspect of the present disclosure relates to a strobe light, which includes a base, a mounting post, a plurality of light emitting diode (LED) lights, and a lens. The base includes a first hole extending vertically there through and at least one lateral hole. The mounting post is secured to the base and includes a pass through bore aligned with the first hole. The plurality of LED lights are positioned on the mounting post. The lens is releasably mounted to the base to enclose at least the plurality of LED lights. The lens includes a second hole aligned with the pass through bore. The at least one lateral hole, the first and second holes, and the pass through bore are arranged in flow communication with each other to provide a path for heat to exit the strobe light.

The base may have a circular shape with top and bottom surfaces and a peripheral edge, wherein the first hole may extend through the base from the top surface to the bottom surface, and the at least one lateral hole may be positioned at the peripheral edge and in flow communication with the first hole along the bottom surface. The lens may be connected to the mounting post with a liquid-tight connection, and the mounting post may be connected to the base with a liquid-tight connection. The strobe light may include a plurality heat transfer fins extending into the pass through bore along a length of the pass through bore. The strobe light may include a connector extending through the second hole and into contact with the mounting post to connect the lens to the mounting post. The connector may include an opening providing a flow path from the pass through bore and out of the lens. The first hole may include a plurality of threads configured to threadably mount the base to a pipe mount.

Another aspect of the present disclosure relates to a method of assembling a strobe light. The method includes providing a base, a lens, a mounting post, and a plurality of light emitting diode (LED) lights positioned on the mounting post, wherein the base includes a first hole, the lens includes a second hole, and the mounting posting includes a pass through bore. The method also includes securing the mounting post to the base, securing the lens to the base with the mounting post and plurality of LED lights enclosed in the lens, and aligning the first and second holes and the pass through bore with each other to create an airflow channel through the strobe light.

The base may include at least one lateral opening positioned at a periphery of the base and being arranged in flow communication with the first hole to create a flow path for air from outside the strobe light to the airflow channel. The method may include connecting the lens to the mounting post with a connector, wherein a portion of the connector may extend through the second hole and into releasable connection with the mounting post. The method may include embedding a plurality of magnets in the base.

A further aspect of the present disclosure relates to a method of transferring heat from a strobe light. The method includes providing a base, a lens mounted to the base, a mounting post mounted to the base, and a plurality of light members positioned on the mounting post, wherein the lens encloses the mounting post and plurality of light members. The method also includes providing an airflow channel through the base, mounting post, and lens, transferring heat generated by the plurality of light members through the mounting post into air held in the airflow channel, and moving the heated air through the airflow channel and out of the strobe light.

The mounting post may include a pass through opening forming part of the airflow channel, and a plurality of heat transfer fins extending along a length of the pass through opening to increase a rate of heat transfer. The method may include providing a liquid-tight seal between the airflow channel and the plurality of light members. The plurality of light members may include a plurality of light emitting diode (LED) lights.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
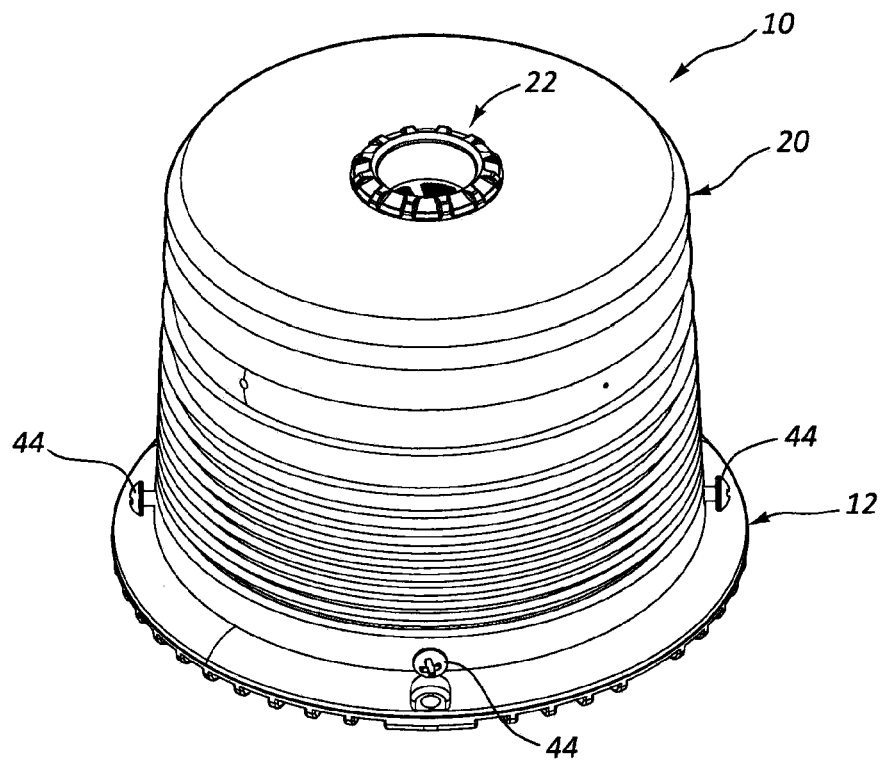
FIG. 1 is a top perspective view of an example LED strobe light in accordance with the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION

As will be described in greater detail below, the present disclosure relates generally to strobe lights, and more particularly relates to strobe lights that include light-emitting diodes (LEDs) as the source of light. The LED strobe light may be programmed to create different light patterns. Some example light patterns include a 360° rotating light, a 360° strobe light, a solid light, and various flashing sequences.

The strobe light may include a plurality of LEDs. The LEDs may be arranged circumferentially and face radially outward. Each LED may be individually controlled with the control system of the strobe light. Controlling the LEDs may include turning on and off the LEDs and varying an intensity of light emitted from the LEDs. Operating the LEDs generates heat. Some operations, such as rotational slower modes, produce large amounts of heat. The heat is typically trapped in the structure (e.g., mounting post) to which the LEDs are mounted and the enclosure defined between the lens and the base, which leads to higher operating temperatures for the LEDs. High operating temperatures are typically the most common reasons for failure and light loss in LEDs. The strobe light designs disclosed herein facilitate heat transfer away from the LEDs. Removing heat from the LEDs may permit the LED strobe light to be operated at higher power levels without sacrificing LED performance, useful life, and light output.

The heat transfer features of the example LED strobe lights disclosed herein may include an air channel, which passes through portions of the LED strobe light. The air channel may be referred to as a chimney, a heat sink chimney, or a heat transfer chimney. The air channel may extend through the base, control board (e.g., main printed circuit board), LED mounting post, and lens to permit air to flow through the LED strobe light. Heat generated by the LEDs may pass into the air channel to heat the air held in the air channel. The heated air may move under natural convection forces out of the LED strobe light. In one example, the base includes inflow openings around its peripheral edge that permit an inflow of air into the base. The inflow of air passes through a post opening positioned centrally on the base, into a pass through bore extending through the control board and mounting post, and out through a hole formed in a top surface of the lens. Since the air held in the air channel rises when heated, natural convention forces may move the heated air out of the LED strobe light and draw unheated air into the air channel.

The air channel may be sealed relative to the electrical components of the LED strobe light. A connector used to connect the lens directly to the mounting post may provide a liquid-tight connection between an outer surface of the lens and the mounting post. Further, the mounting post may have a liquid-tight connection with the control board and base, and the lens may be connected to the base with a liquid-tight connection. The electrical components of the LED probe light, which are enclosed between the base and the lens, may be sealed (e.g., waterproof) from the air channel. As such, the air channel may be exposed to environmental conditions, such as rain or snow, during use of the LED strobe light and the electrical components are protected from exposure to those environmental conditions.

The LED strobe light may include features that accelerate heat transfer from the LEDs to the air held in the air channel. For example, the mounting post may include a plurality of heat transfer fins extending into the pass through bore. The pass through bore may includes a plurality of grooves, protrusions or other surface features formed on surfaces thereof (e.g., on surfaces of the heat transfer fins). The heat transfer fins and surface features may increase the surface area of the pass through bore, thereby increasing the rate of heat transfer.

Another aspect of the present disclosure relates to the use of magnets in the base of the LED strobe light. The magnets may assist in releasably mounting the LED strobe light to a support structure such as a hood or cab of a vehicle. The magnets may be embedded in the base. For example, the magnets may be embedded in the polymeric (e.g., plastic) materials from which the base is formed. The magnets may be positioned at spaced apart locations along a bottom surface of the base. The magnets, when spaced as close to the peripheral edge of the base as possible, may provide a stronger pulling force because of the wider magnetic footprint of the base. The embedding of the magnets may provide a non-scratch, waterproof arrangement for the magnets on the base.

Figure 2:
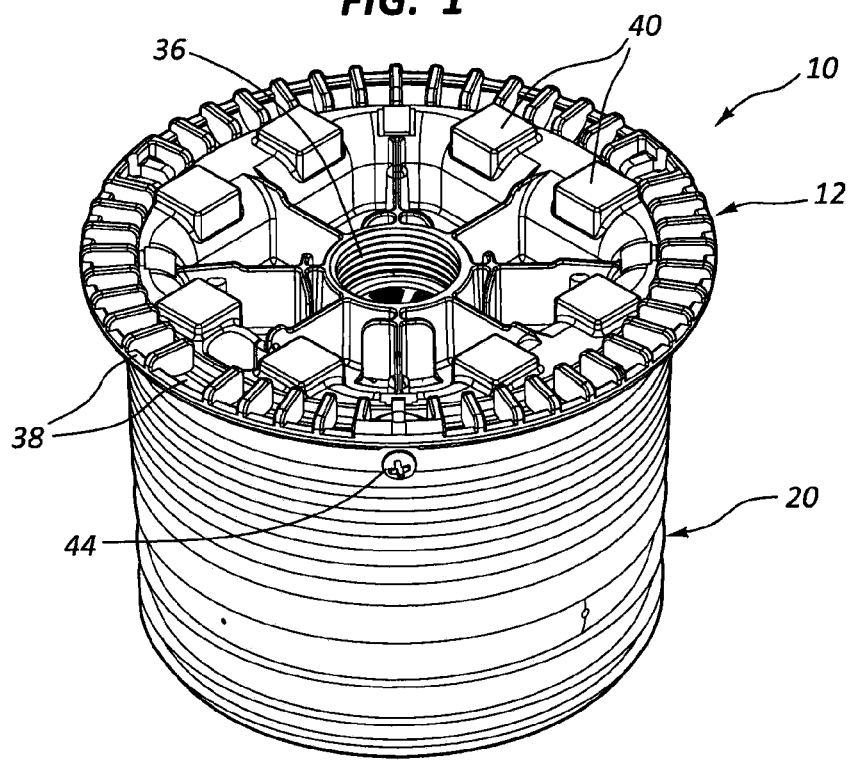
FIG. 2 is a bottom perspective view of the LED strobe light of FIG. 1.
Figure 3:
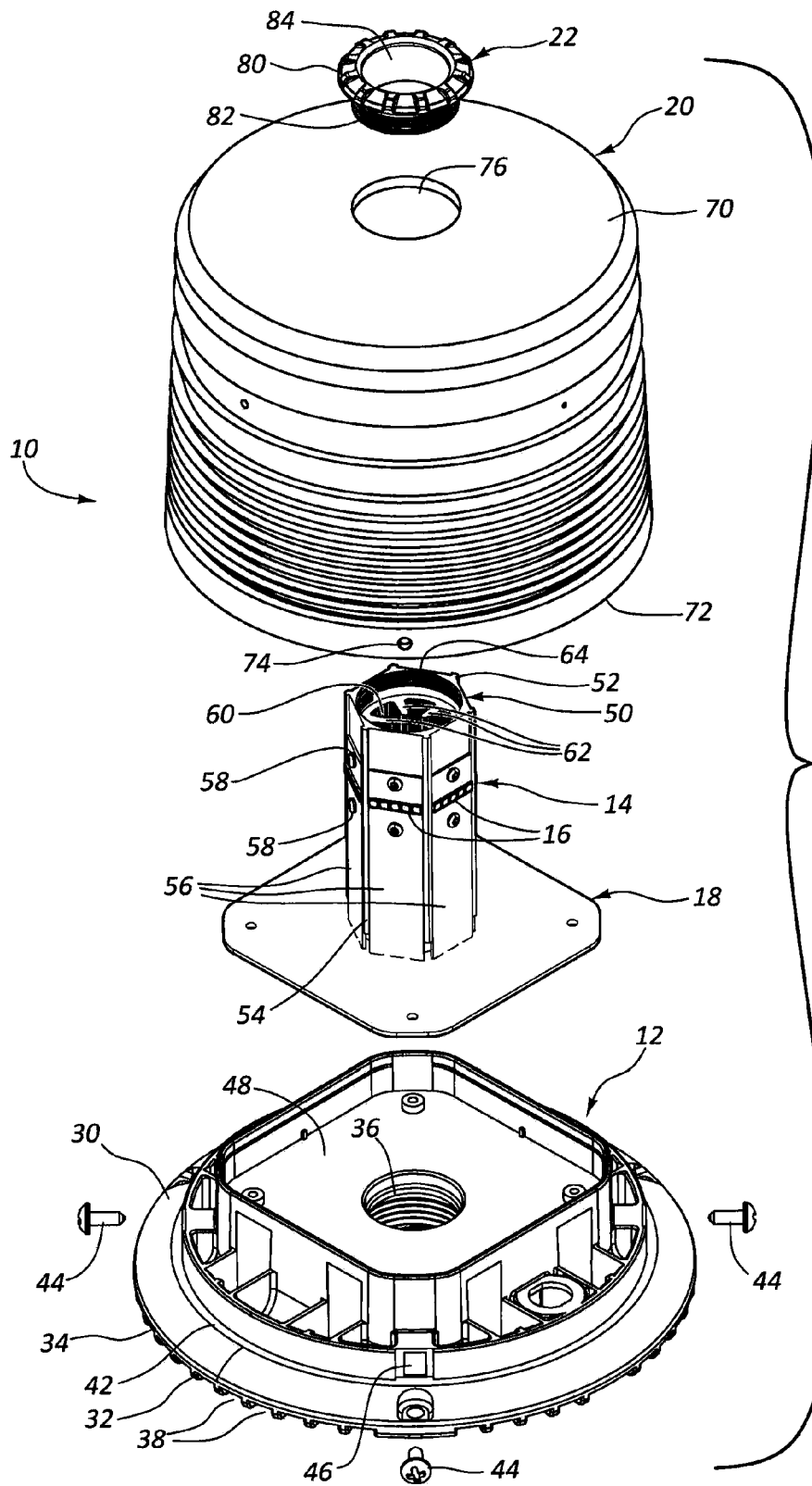
FIG. 3 is an exploded perspective view of the LED strobe light of FIG. 1.
Figure 4:
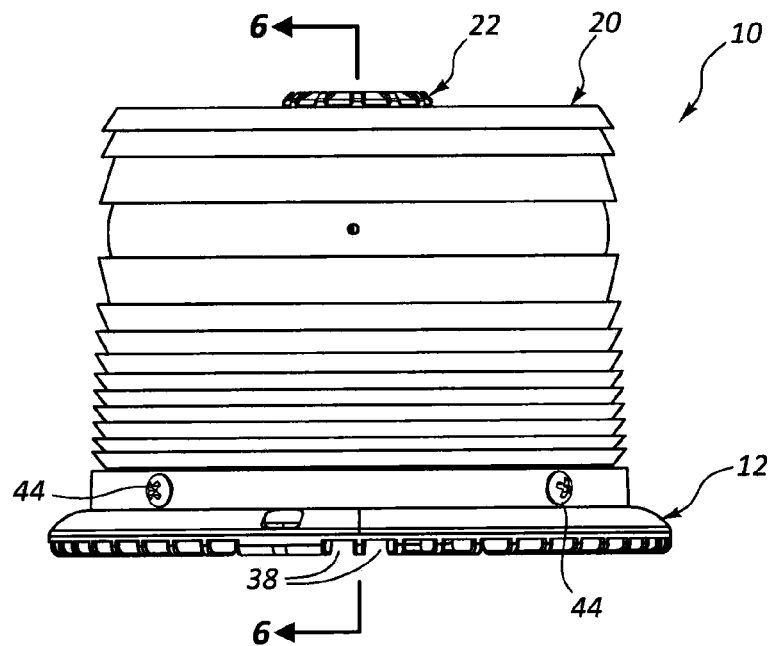
FIG. 4 is a side view of the LED strobe light of FIG. 1.
Figure 5:
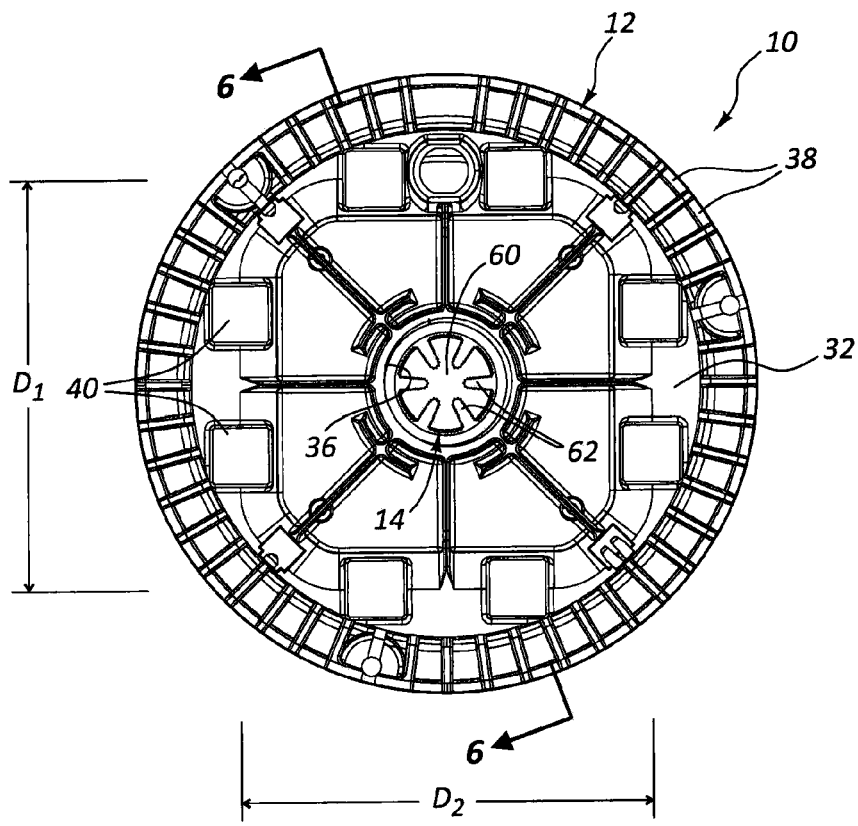
FIG. 5 is a bottom view of the LED strobe light of FIG. 1.
Figure 6:
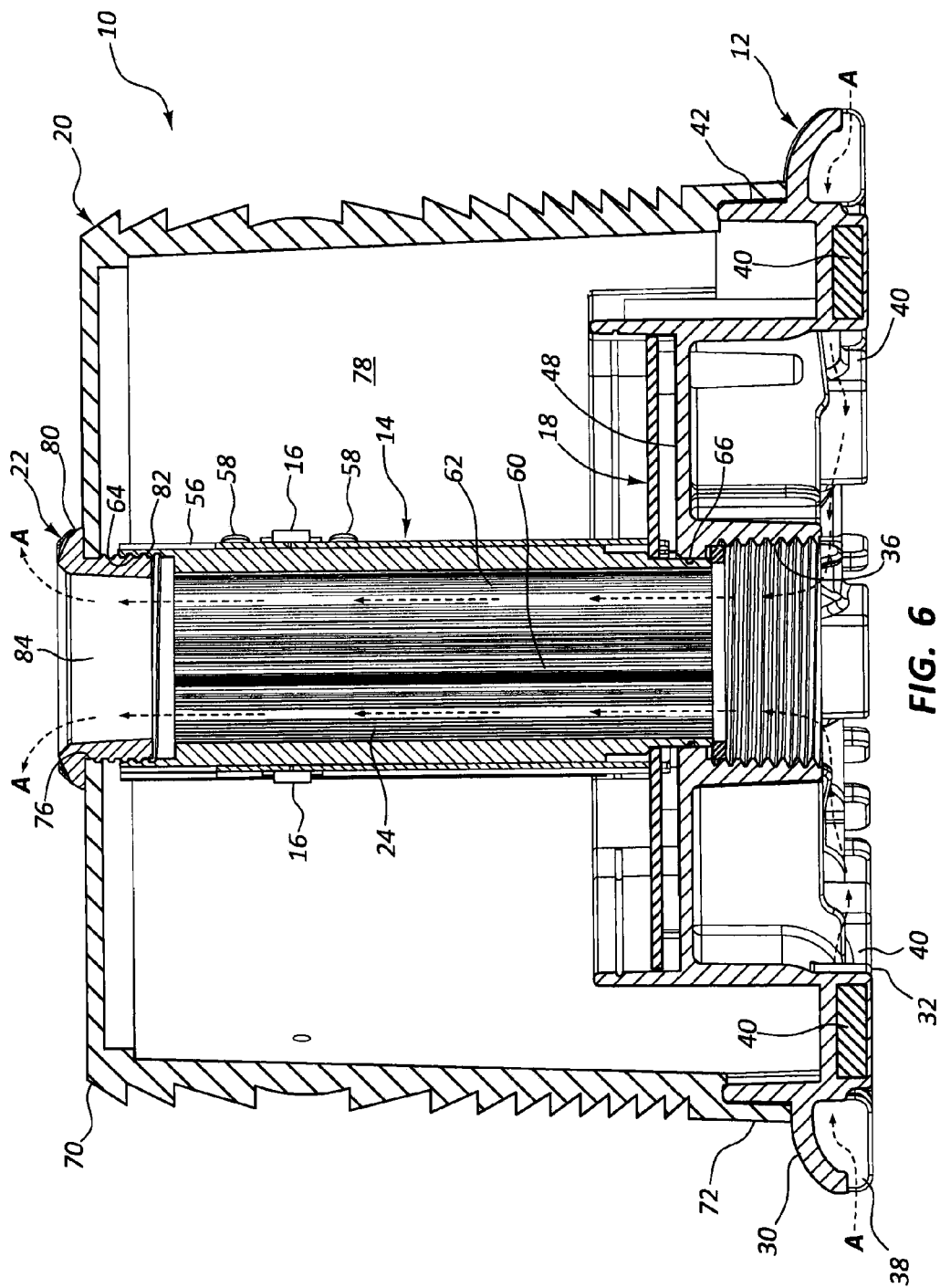
FIG. 6 is a cross-sectional view of the LED strobe light of FIG. 4 taken along cross-section indicators 6-6.
Figure 7:
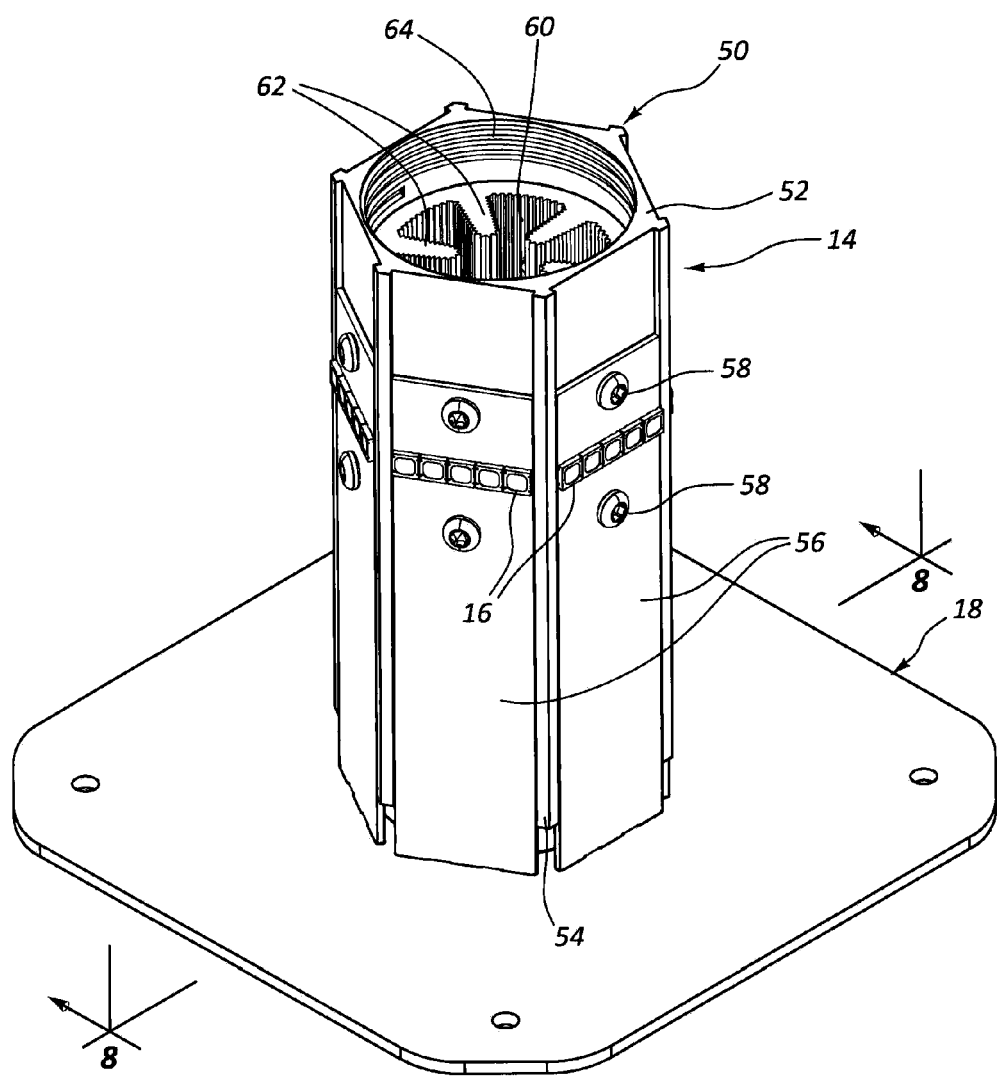
FIG. 7 is a perspective view of a mounting post assembly and control board of the LED strobe light shown in FIG. 3.
Figure 8:
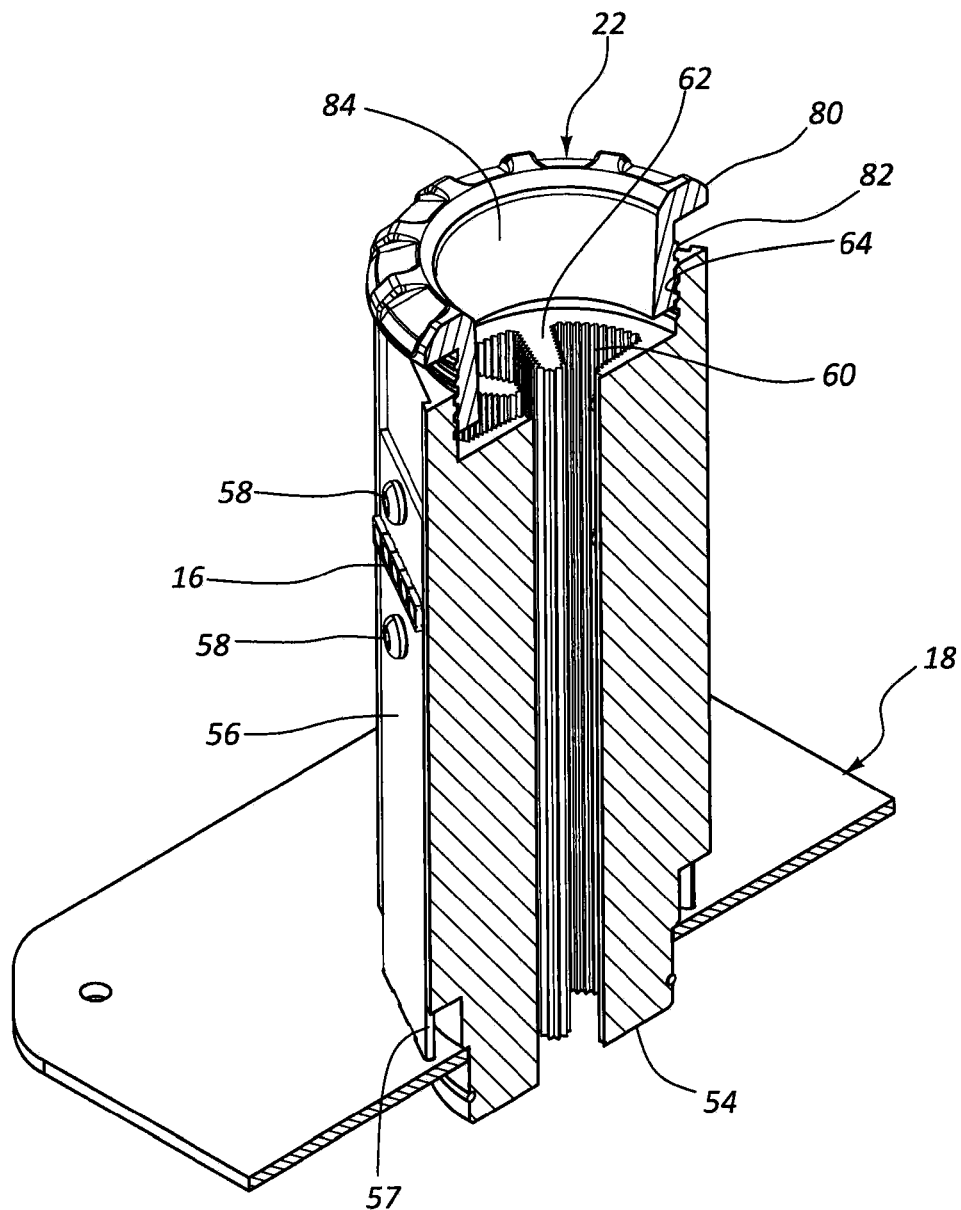
FIG. 8 is a cross-sectional view of the mounting post assembly and control board shown in FIG. 7.
Figure 9:
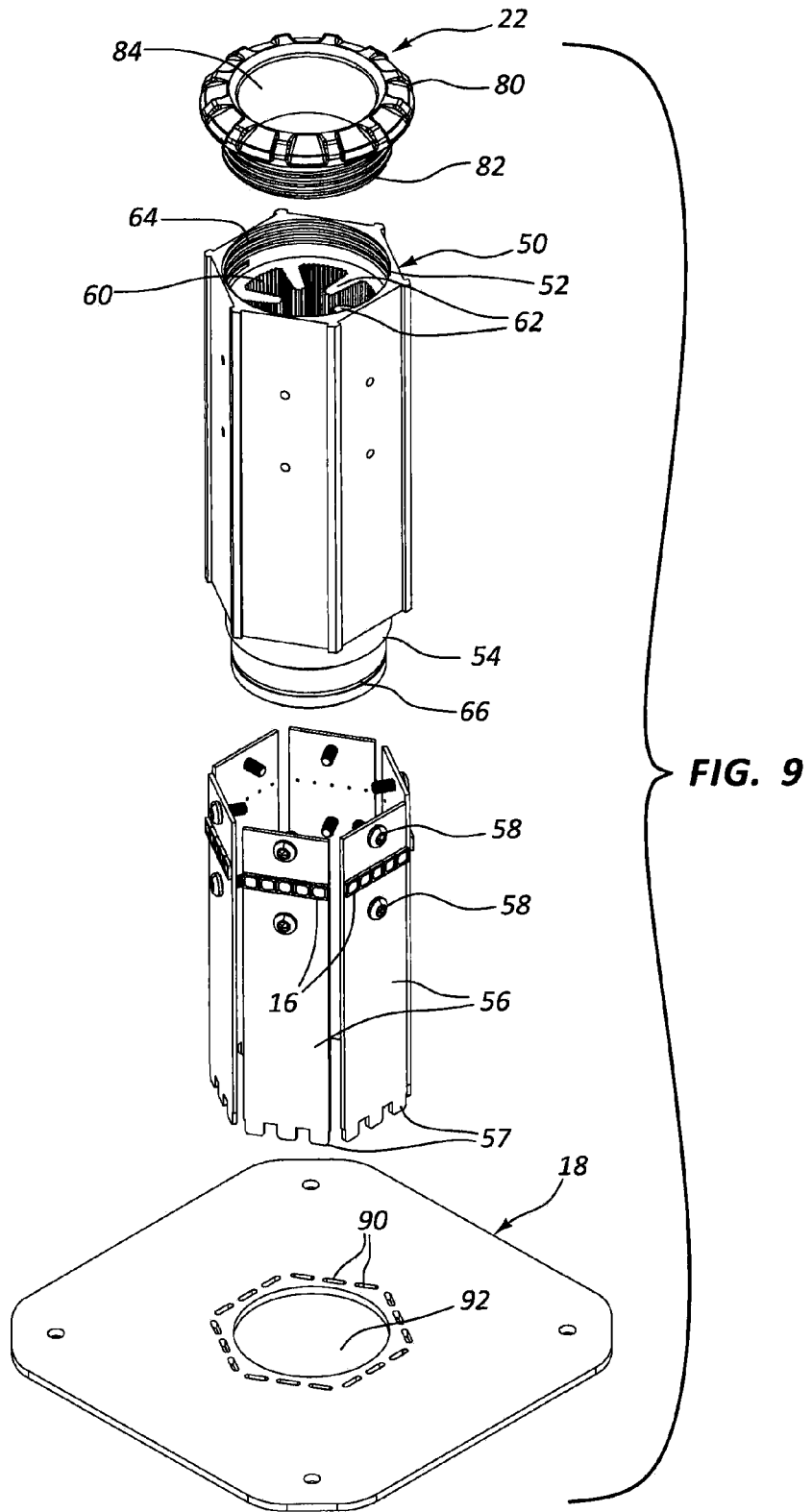
FIG. 9 is an exploded perspective view of the mounting post assembly and control board of FIG. 7.
Figure 10:
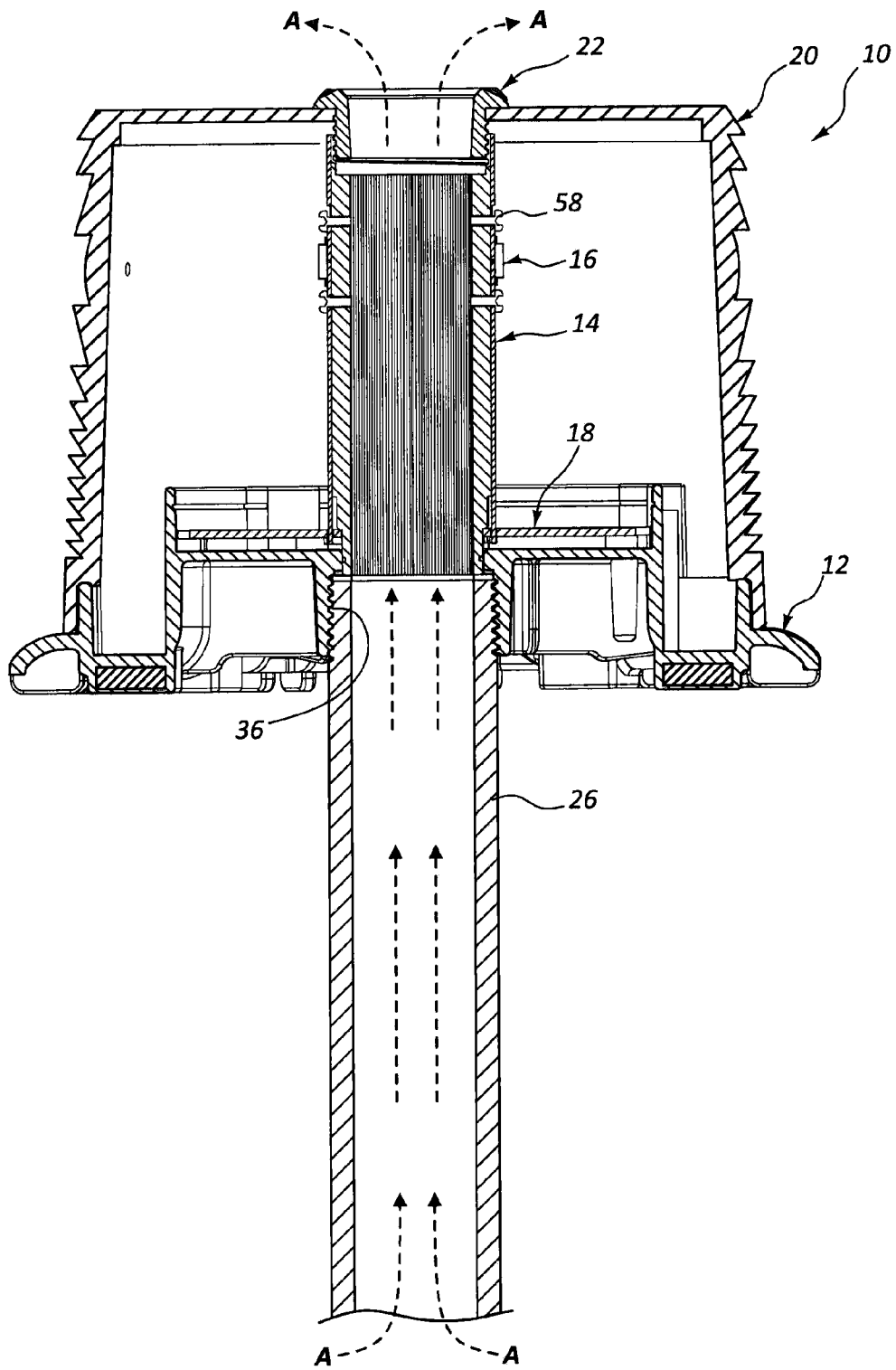
FIG. 10 is a cross-sectional view of the LED strobe light shown in FIG. 6 mounted to a support pipe.

Referring now to FIGS. 1-9, an example LED strobe light 10 is shown and described. FIGS. 1, 2 and 4-6 show the LED strobe light 10 fully assembled. The LED strobe light is shown in FIG. 3 in a partially exploded view. Portions of the LED strobe light 10 are shown in FIGS. 7-9. The LED strobe light 10 is shown in FIG. 10 mounted to a support pipe to provide an alternative mounting for and airflow path through the LED strobe light 10.

The LED strobe light 10 includes a base 12, a mounting post assembly 14, a plurality of LED lights 16, a control board 18, a lens 20, and a lens connector 22, as shown in FIG. 3. The control board 18 is mounted to the mounting post assembly 14. The mounting post assembly 14 is connected to the control board 18 and base 12. The lens 20 is releasably connected to the base 12 along a bottom end of the lens 20. The lens is also connected to the mounting post assembly 14 at a top end of the lens 20 (see FIG. 6).

The lens 20 is connected to the mounting post assembly 14 with the lens connector 22. An air channel may extend through the LED strobe light 10 from the top end of the lens 20 (e.g., at the lens connector 22) to the bottom side of the base 12 (see FIG. 6). The air channel may also extend laterally from a peripheral edge of the base, along the bottom side of the base, and into a center mount aperture formed in the base. In another arrangement, the air channel extends through a mounting device, such as the pipe 26 shown in FIG. 10, rather than extending laterally to the lateral openings along the peripheral edge of the base.

The base 12 includes top and bottom sides 30, 32, a peripheral edge 34, a center mount aperture 36, a plurality of lateral openings 38, a plurality of embedded magnets 40, a lens seat 42, a plurality of lens fasteners 44, a plurality of fastener openings 46, and a mounting seat 48, as shown in FIGS. 3 and 6. The lateral openings 38 are formed along the peripheral edge 34 to provide access to the bottom side 32 of the base 12. The lateral openings 38 are in flow communication with the center mount aperture 36. The center mount aperture 36 may be positioned centrally on the base 12 and may extend along a central axis of the base 12. The center mount aperture 36 may include a plurality of threads. The threads of center mount aperture 36 may be configured for mounting the LED strobe light 10 to a mounting device such as the pipe 26 shown in FIG. 10.

The magnets 40 may be positioned at various spaced apart positions along the bottom side 32 as shown in FIG. 5. The magnets 40 may have any desired shape and size. For example, the magnets 40 may have a cubical or cylindrical shape. The magnets 40 may be positioned in pairs as shown in FIG. 5 at spaced apart locations around the center mount aperture 36. The magnets 40 may be spaced apart a distance $D_1, D_2$ from magnets on an opposite side of the base, as shown in FIG. 5. The distances $D_1, D_2$ may be maximized in order to maximize a pulling force and widen a pulling force footprint for the base 12. The magnets 40 may be embedded in material from which the base 12 is formed. For example, the base 12 may comprise a polymeric material such as molded plastic.

The magnets 40 may be co-molded into the polymeric materials of base 12. In other arrangements, the base 12 may include a plurality of recesses, grooves or chambers within which the magnets 40 are positioned and then secured in place using, for example, a fastener, adhesives, or a press-fit connection. A cover or film may be placed over the magnets 40 to protect the magnets 40 from corrosion and also provide a low abrasive or no scratch interface with the support structure to which the LED strobe light is mounted (e.g., a hood or cab of a vehicle). The magnets 40 may be define at least in part a lower most surface of the base 12 as shown in FIG. 6 so that the magnets 40 (or at least the material within which the magnets 40 are embedded) contact the support surface.

The lens seat 42 of the base 12 is receptive of a bottom end of the lens 20, as shown in FIGS. 1, 2 and 6. The lens fasteners 44 extend through the lens 20 and into the fastener openings 46, as shown in FIG. 3. The lens fasteners 44 provide a releasable connection of the lens 20 to the base 12. An interface between the lens 20 and the base 12 may provide a liquid-tight connection. In some examples, the LED strobe light 10 is maintained in a vertically upright position, such as the orientation shown in FIG. 4. When in an upright position, any liquid applied to the lens 20 runs vertically downward and off of the base 12 and is unable to pass through the interface between the lens 20 and the base 12 at the lens seat 42. If the LED strobe light 10 were operated in a horizontal or upside down orientation, additional sealing features may be used between the lens 20 and base 12 to improve the liquid-tight connection there between. A sealing device such as an O-ring may be provided at an interface between the lens 20 and base 12 to improve the liquid-tight connection.

The mounting post assembly 14 is shown in FIGS. 3 and 7-9 including a mounting post 50 having top and bottom ends 52, 54, a plurality of secondary printed circuit boards (PCBs) 56, PCB fasteners 58, and a pass through bore 60. The mounting post assembly 14 may also include a plurality of heat transfer fins 62 extending into the pass through bore 60, a connector seat 64 positioned at the top end 52, and a base mounting portion 66 at the bottom end 54. The PCB fasteners 58 secure the secondary PCBs 56 to the mounting post 50 at spaced apart locations around an outer periphery of the mounting post 50. The heat transfer fins 62 may extend along a length of the mounting post 50 and may be arranged at circumferentially spaced apart locations within the pass through bore 60.

The pass through bore 60 may include a plurality of recesses, protrusions or other surface features along surfaces of the pass through bore 60. The surface features may extend axially along the length of the pass through bore 60. The surface features may be formed on the heat transfer fins 62. The surface features may increase the surface area within the pass through bore 60 to promote increased heat transfer from the mounting post 50 to the air moving through the pass through bore 60. Other heat transfer features of different sizes, shapes, and orientations may be positioned within pass through bore 60. The heat transfer fins 62 may be arranged at different orientations such as in a helical orientation or may extend laterally across the width of the pass through bore 60 at spaced apart locations along the length of pass through bore 60.

During use, the LED lights 16, which are mounted to the secondary PCBs 56 as shown in at least FIGS. 3 and 7-9, generate heat that is directly passed through the secondary PCBs 56 and PCB fasteners 58, and into the mounting post 50. The heat then passes through the wall of the mounting post 50 and into the air positioned in the pass through bore 60. The air circulating within the lens 20 in the space surrounding the mounting post assembly 14, which has also been heated by the LED lights 16, may further heat the mounting post 50.

Generally, the mounting post assembly 14 may be designed to enhance heat transfer directly from the LED lights 16 and from the air captured within the lens 20, through the wall of the mounting post 50 and into the air held in pass through bore 60. The air in pass through bore 60 may then move out of the LED strobe light 10 as part of a heat transfer system that lowers the temperature conditions within the LED strobe light 10, such as the temperature of the LED lights 16 themselves. As discussed above, lower temperatures within the LED strobe light 10 may have a number of advantages related to operation of the LED light 16.

The connector seat 64 of the mounting post assembly 14 may include a plurality of threads or other connecting features for connection to the lens connector 22. The base mounting portion 66 may extend through the control board 18 and into the center mount aperture 36 of the base 12, as shown in FIG. 6. The base mounting portion 66 may have a liquid-tight connection with the control board 18 and a liquid-tight connection with the base 12 at the center mount aperture 36. The base mounting portion 66 may include a sealing structure such as, for example, an O-ring, step feature, or other sealing structure, which enhances the liquid-tight interface between the mounting post assembly 14, the control board 18, and base 12.

The control board 18 may include a plurality of PCB mounting apertures 90 and an opening 92. The secondary PCBs 56 of the mounting post assembly 14 may include a plurality of PCB connectors 57, which extend through the PCB mounting apertures 90. The PCB connectors 57 may provide an electrical connection between circuitry of the mounting post assembly 14 and circuitry of the control board 18.

The opening 92 may be sized to receive the base mounting portion 66. When the mounting post assembly 14 is mounted to the base 12, as shown in FIG. 6, the opening 92 and pass through bore 60 are aligned with the center mount aperture 36 of the base 12 to permit flow communication from the base 12 to the mounting post assembly 14 (e.g., vi an air channel 24 as shown in FIG. 6).

The lens 20 includes top and bottom ends 70, 72, a plurality of fastener openings 74, an airflow opening 76, and an interior 78 (see FIGS. 3 and 6). The airflow opening 76 is formed in a surface of the lens 20 along the top end 70. The bottom end 72 fits within the lens seat 42 of the base 12. The lens fasteners 44 extend through the fastener openings 74 and into the fastening openings 46 of the base 12 to provide a releasable connection of the lens 20 to the base 12. The lens 20 encloses the mounting post assembly 14, LED lights 16, and control board 18 within the interior 78 between the lens 20 and base 12 (see FIG. 6).

During operation of the LED strobe light 10, heat generated by the LED lights 16 is captured within the interior 78 of the lens 20. The heated interior 78 creates an increased temperature environment for the LED lights 16. Some of the heat collected in the interior 78 may increase the temperature of the lens 20, the base 12, the mounting post assembly 14, and the control board 18. The heat within base 12, mounting post assembly 14, and control board 18 and lens 20 may at least partially transferred into the air held within the air channel 24 and which passes out of the LED strobe light 10. This transfer of heat away from the LED strobe light 10 may lower the temperature within interior 78, which may have advantages in operation of the LED lights 16 as described above.

The lens connector 22 may include a flange 80, a protrusion 82, and an opening 84. The flange 80 may extend along an outer surface of the lens 20 adjacent to the airflow opening 76. The flange 80 and protrusion 82 may provide a liquid-tight seal between the lens connector 22 and the lens 20 at the airflow opening 76. The protrusion 82 may include, for example, threads or other connection features to provide a releasable connection with the mounting post assembly 14. The protrusion 82 may extend into and connect with the connector seat 64 of the mounting post assembly 14, as shown in FIG. 6. For example, a threaded connection may be formed between the protrusion 82 and the connector seat 64. The lens connector 22 may also have a liquid-tight connection with the mounting post assembly 14. The lens connector 22 may provide a liquid-tight connection between an outer surface of the lens 20 and the mounting post assembly 14. The opening 84 may be aligned with the pass through bore 60 of the mounting post assembly 14 such that the air channel 24 extends continuously from the bottom side 32 of the base 12 to the top surface of the lens 20, as shown in FIG. 6.

FIG. 6 shows an airflow path A passing through the LED strobe light 10 (e.g., through the air channel 24). The airflow path A begins at the lateral openings 38 along the peripheral edge 34 of the base 12. The airflow path A moves along the bottom side 32 of the base 12 and into the center mount aperture 36. Airflow path A continues along the air channel 24, which includes the opening 92 in the control board 18, the pass through bore 60, and the opening 84 in lens connector 22, and out through the airflow opening 76 of lens 20. The entire airflow path A is arranged with a liquid-tight seal relative to the electronics of the LED strobe light 10, which are positioned within the interior 78 when the LED strobe light 10 is assembled, as shown in FIG. 6. The electronics of the LED strobe light 10 may be associated with the secondary PCBs 56, the LED lights 16, and the control board 18.

Air in the airflow path A typically moves in the direction of the arrows shown in FIG. 6 under natural convection forces. As the air held within the air channel 24 becomes heated upon transfer of heat through the wall of the mounting post 50, the heated air naturally rises vertically out through the opening 84 in lens connector 22. This movement of heated air in a vertical direction creates a low pressure environment that draws air through the lateral openings 38 and the center mount aperture 36 and into the air channel 24. During operation of the LED strobe light 10, air continually flows along the airflow path A to reduce the temperature of the mounting post 50 and thereby lower the temperature in the area of the LED lights 16. As discussed above, lowering the temperature of the LED lights 16 and the area around the LED lights 16 may enable brighter modes of operation, including the rotational slower modes that produce large amounts of heat. Furthermore, lowering the temperature in LED lights 16 and the area around the LED lights 16 may increase an operating life of the LED light 16, permit improved light output of the LED light 16, and/or permit operation of the LEDs at higher power levels without sacrificing the LED performance as compared to other LED strobe lights in which no airflow or heat transfer features are included.

FIG. 10 shows an alternative arrangement for the airflow path A. FIG. 10 shows the LED strobe light 10 mounted to a pipe 26, which is a common mounting arrangement for elevating the LED strobe light 10. The airflow path A begins at a bottom end of the pipe 26, extends along the length of the pipe 26, and passes into the air channel 24 via the center mount aperture 36.

Other mounted arrangements for the LED strobe light 10 may take advantage of other airflow paths separate from those shown in FIGS. 1-10 or in combination with the arrangement shown in FIGS. 1-10. For example, a single lateral opening 38 may be formed in the base 12 along the peripheral edge 34. In other arrangements, a plurality of center mount apertures 36 may be formed in the base 12 and arranged in flow communication with the pass through bore 60 of the mounting post assembly 14. The LED strobe light may include a plurality of air channels extending therethrough via, for example, a plurality of mounting post assemblies 14, or other channels, pass through bores, airflow paths, etc., which may extend through the individual parts of the LED strobe light (e.g., the base, mounting post assembly, and lens) or through multiple features of the LED strobe light.

Various methods may be associated with the LED strobe lights disclosed herein. One example method includes a method of assembling an LED strobe light. An example method of assembling an LED strobe light may include, for example, providing a lens, a base, a mounting post assembly, LED lights, and a control board. The method may also include forming a first hole in the base, a second hole in the lens, a third hole in the control board, and a pass through bore extending through the mounting post assembly. The method may include securing the control board and mounting post assembly to the base, securing the lens to the base and to the mounting post, mounting a plurality of LEDs to the mounting post assembly, and aligning the first, second and third holes with the pass through bore to create an airflow channel through the LED strobe light.

Another example relates to a method of transferring heat from a strobe light. The method may include providing a base, a lens mounted to the base, a mounting post assembly mounted to the base, and a plurality of LED lights positioned on the mounting post. The lens may enclose the mounting post and plurality of LED lights when the lens is mounted to the base. A control board may be interposed between the mounting post assembly and the base. The method may include providing an airflow channel through the base, mounting post, lens and control board. The method may further include transferring heat generated by the plurality of LED lights through a wall of the mounting post and into air held in the airflow channel. The heated air is moved through the airflow channel and out of the strobe light.

The mounting post may include a pass through opening forming part of the airflow channel. A plurality of heat transfer fins may extend along the length of the pass through opening to increase a rate of heat transfer from the mounting post to the air in the airflow channel. The method may also include providing a liquid-tight seal between the airflow channel and the plurality of LED lights and other electronics of the LED strobe light. The method may include providing a natural convection flow of heated air through the LED strobe light along the length of the airflow channel.

A further method relates to releasably mounting an LED strobe light to a support structure using a magnetic force. The LED strobe light may include a plurality of magnets positioned along a bottom side thereof. The magnets may be encapsulated or embedded within material from which the base is formed. For example, the magnets may be embedded within polymeric material from which the base is formed. The magnets may be spaced apart a maximum distance from each other and may be positioned as close to an outer periphery of the base as possible to maximize a pull force applied by the magnets to the support structure.

While the heat transfer features disclosed herein have been described with reference to an LED strobe light, an example of which is described in U.S. patent application Ser. No. 13/796,867, filed on 12 Mar. 2013, and entitled "LED Strobe Light," which application is incorporated herein in its entirety by this reference, the heat transfer features may be used with other types of light fixtures such as, for example, strobe lights that utilize different light sources in place of LEDs.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A strobe light, comprising:
    a base;
    a mounting post extending vertically from the base;
    a plurality of light emitting diode (LED) lights mounted around a periphery of the mounting post;
    a lens connected to the base and covering the mounting post and the plurality of LED lights;
    a connector configured to connect the mounting post to the lens;
    a channel extending vertically through the base, mounting post, connector, and lens;
    wherein air flowing through the channel transfers heat generated by the plurality of LED lights out of an opening in a top surface of the strobe light.

2. The strobe light of claim 1, wherein the channel has a liquid-tight interface with the base, mounting post and lens.

3. The strobe light of claim 1, wherein the connector extends through the lens and is threadably connected to the mounting post.

4. The strobe light of claim 1, wherein the lens includes a bottom end and a top end, the bottom end being releasably connected to the base, and the channel extending through the top end.

5. The strobe light of claim 1, further comprising a plurality of fins extending radially into the channel.

6. The strobe light of claim 5, wherein the plurality of fins extend along a length of the mounting post.

7. The strobe light of claim 1, wherein the base includes a plurality of side openings to permit airflow into the channel along a bottom side of the base.

8. The strobe light of claim 1, wherein when the strobe light is oriented with the mounting post extending vertically upward from the base, the channel is open along a top surface of the lens.

9. The strobe light of claim 1, wherein the base includes a plurality of magnets embedded in the base.

10. A strobe light, comprising:
    a base, the base having a first hole extending vertically through the base, the base having at least one lateral hole;
    a mounting post secured to the base and having a pass through bore, the pass through bore being aligned with the first hole;
    a plurality of light emitting diode (LED) lights positioned on the mounting post;

a lens releasably mounted to the base to enclose at least the plurality of LED lights, the lens having a second hole aligned with the pass through bore;

a connector extending through the second hole and into contact with the mounting post to connect the lens to the mounting post;

wherein the at least one lateral hole, the first and second holes, and the pass through bore are arranged in flow communication with each other to provide a path for heated air to exit a top end of the strobe light.

11. The strobe light of claim 10, wherein the base has a circular shape with top and bottom surfaces and a peripheral edge, the first hole extending through the base from the top surface to the bottom surface, and the at least one lateral hole being positioned at the peripheral edge and in flow communication with the first hole along the bottom surface.

12. The strobe light of claim 10, wherein the lens is connected to the mounting post with a liquid-tight connection, and the mounting post is connected to the base with a liquid-tight connection.

13. The strobe light of claim 10, further comprising a plurality heat transfer fins extending into the pass through bore along a length of the pass through bore.

14. The strobe light of claim 10, wherein the connector includes an opening providing a flow path from the pass through bore and out of the lens.

15. The strobe light of claim 10, wherein the first hole includes a plurality of threads configured to threadably mount the base to a pipe mount.

16. A method of assembling a strobe light, comprising:
providing a base, a lens, a mounting post, a connector, and a plurality of light emitting diode (LED) lights positioned on the mounting post, the base including a first hole extending vertically through the base, the lens including a second hole, the connector including a third hole, and the mounting post including a pass through bore;
securing the mounting post to the base;
securing the lens to the base with the mounting post and plurality of LED lights enclosed in the lens;
aligning the first hole, the second hole, the third hole, and the pass through bore with each other to create an airflow channel, the airflow channel extending through a top end of the strobe light.

17. The method of claim 16, wherein the base includes at least one lateral opening positioned at a periphery of the base, the at least one lateral opening being arranged in flow communication with the first hole to create a flow path for air from outside the strobe light to the airflow channel.

18. The method of claim 16, further comprising connecting the lens to the mounting post with the connector, a portion of the connector extending through the second hole and into releasable connection with the mounting post.

19. The method of claim 16, further comprising embedding a plurality of magnets in the base.

20. A method of transferring heat from a strobe light, comprising:
providing a base, a lens, a connector connecting the lens to the base, a mounting post mounted to the base, and a plurality of light members positioned on the mounting post, the lens enclosing the mounting post and plurality of light members;
providing an airflow channel vertically through the base, mounting post, connector, and lens;
transferring heat generated by the plurality of light members through the mounting post into air held in the airflow channel;
moving the heated air through the airflow channel and out of a top surface of the strobe light.

21. The method of claim 20, wherein the mounting post includes a pass through opening forming part of the airflow channel, and a plurality of heat transfer fins extending along a length of the pass through opening to increase a rate of heat transfer.

22. The method of claim 21, further comprising providing a liquid-tight seal between the airflow channel and the plurality of light members.

23. The method of claim 20, wherein the plurality of light members may include light emitting diode (LED) lights.

24. A strobe light, comprising:
a base;
a mounting post extending vertically from the base;
a plurality of light emitting diode (LED) lights mounted around a periphery of the mounting post;
a lens connected to the base and covering the mounting post and the plurality of LED lights;
a channel extending through the base, mounting post and lens;
wherein air flowing through the channel transfers heat generated by the plurality of LED lights out of the strobe light;
wherein the connector extends through the lens and is threadably connected to the mounting post.

25. A strobe light, comprising:
a base having a first hole extending vertically there through and at least one lateral hole;
a mounting post secured to the base and having a pass through bore, the pass through bore being aligned with the first hole;
a plurality of light emitting diode (LED) lights positioned on the mounting post;
a lens releasably mounted to the base to enclose at least the plurality of LED lights, the lens having a second hole aligned with the pass through bore;
a connector extending through the second hole and into contact with the mounting post to connect the lens to the mounting post;
wherein the at least one lateral hole, the first and second holes, and the pass through bore are arranged in flow communication with each other to provide a path for heat to exit the strobe light.

26. The strobe light of claim 25, wherein the connector includes an opening providing a flow path from the pass through bore and out of the lens.

27. A method of assembling a strobe light, comprising:
providing a base, a lens, a mounting post, and a plurality of light emitting diode (LED) lights positioned on the mounting post, the base including a first hole, the lens including a second hole, and the mounting post including a pass through bore;
securing the mounting post to the base;
securing the lens to the base with the mounting post and plurality of LED lights enclosed in the lens;
aligning the first and second holes and the pass through bore with each other to create an airflow channel through the strobe light;
connecting the lens to the mounting post with a connector, a portion of the connector extending through the second hole and into releasable connection with the mounting post.

* * * * *